Dec. 13, 1927.  
J. P. CATLIN  
1,652,468  
BEARING  
Filed Sept. 10, 1923
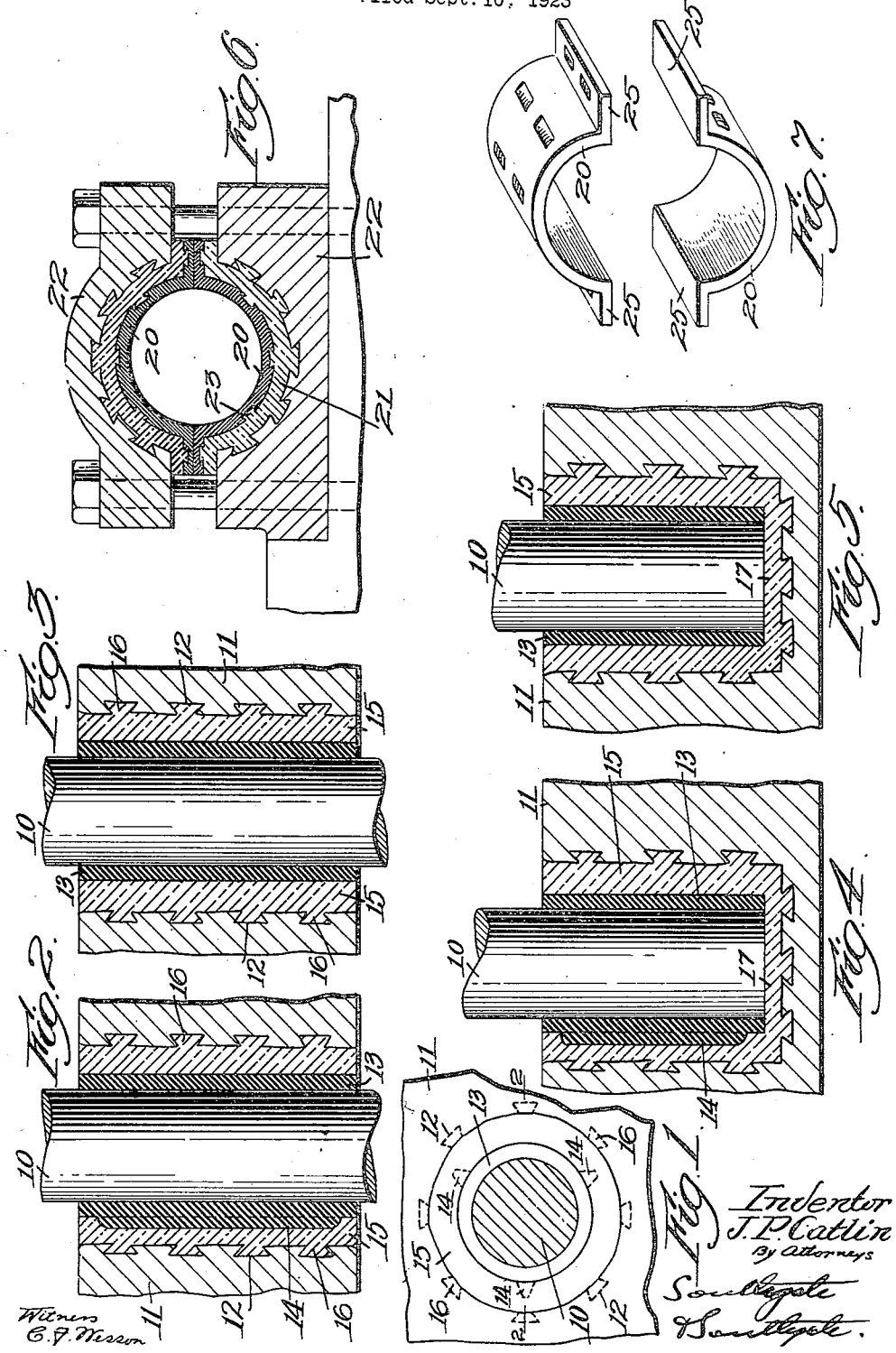

Patented Dec. 13, 1927.

1,652,468

UNITED STATES PATENT OFFICE.

JOSEPH P. CATLIN, OF PLAINFIELD, NEW JERSEY, ASSIGNOR TO WOOD NEWSPAPER MACHINERY CORPORATION, OF NEW YORK, N. Y., A CORPORATION OF VIRGINIA.

BEARING.

Application filed September 10, 1923. Serial No. 661,927.

This invention relates to the production of a bearing or support for a shaft or other element. The principal object of the invention is to provide a seating surface or bearing preferably for a shaft or other movable element without machining the parts of the frame or body in which the bearing or the like is supported and to avoid the use of metal of too high class all through the same. Other objects and advantages of the invention will appear hereinafter.

Reference is to be had to the accompanying drawings, in which

Fig. 1 is an end view of a bearing for a shaft constructed in accordance with this invention, the shaft appearing in section;

Fig. 2 is a central sectional view of the same along the line 2—2 of Fig. 1;

Fig. 3 is a view similar to Fig. 2, showing a modification;

Figs. 4 and 5 are similar views showing other modifications;

Fig. 6 is a transverse sectional view of a bearing box in two parts also constructed in accordance with this invention, and Fig. 7 is a perspective view of the two inside bearing elements separated.

In the form shown in Figs. 1 and 2, I have provided for the support of the shaft 10 in a bearing provided in a support or frame 11. This may be a machine frame or anything else in fact. This frame or support 11 preferably is produced as usual of cast iron, but I do not cast it solid where the shaft is to pass through and then bore a hole for the shaft or bore it out and then finish the inside surfaces. Instead I place a core in the mold which will produce, when the iron casting 11 is made, a substantially cylindrical hole or passage all the way through the frame in this case and having dove-tailed recesses 12 or other undercut depressions spaced around it at intervals. This reduces the amount of cast iron used for the frame 11 in the first place and the inside surface of this passage is not finished in any way. The sand and other adhering matters are merely snagged off and the recesses cleared out. This finishes the casting 11 and there is no machine work on it at this point.

A bush 13 made of suitable bearing metal is made in a die casting mold or, if preferred, in the usual sand cast manner and finished in a machine tool, as is customary. This bush is finished on its inner surface to receive a shaft or stud 10 so that the latter may slide or rotate freely therein. The outer surface of bush 13 need not necessarily be finished but may preferably be left as it comes from the sand mold or, it may be fitted with fins 14 cast integrally therewith. The method of fastening bush 13 within the core hole in the casting 11 is as follows:— Bush 13 is placed upon stud 10 and both located centrally within the core hole hereinbefore described. A quantity of molten metal of a grade inferior and cheaper than that from which bush 13 is made, is thereupon poured into the space between the interior of hole in casting 11 and the exterior of bush 13. This metal marked 15 on Figs. 2, 3, 4 and 5, flows into the interstices 12 and 16, anchoring itself therein and contracting against the rough surface of the exterior of bush 13 forming as it does so, a perfect lock between these two members. The fins 14 shown in Figs. 1, 2 and 4 perform the same functions as the rough exterior of bush 13 and may be used whenever the material from which bush 13 is made is not inherently rough.

The purpose of forming the bearings in this manner is to enable shaft 10 to be readily removed from the finished hole in the frame 11 after the pouring operation. It is possible, of course, to insert shaft 10 into a rough hole in casting 11 and pour a quantity of bearing metal into the space between them. This would produce a wall of bearing metal of more than the necessary thickness, thereby increasing the expense of said operation. In addition to this and what is more annoying, is the difficulty of removing a shaft from a freshly made cast, due to the gripping action incident to the contraction in cooling, this difficulty being aggravated by the fact that several such shafts may be placed in a single frame, making the operation of removing same an extremely impracticable one. The manner of procedure described above, however, permits a bush which has been previously finished to fit shaft 10 so that it may slide easily on it to be cast into the frame 11. Thus, all contraction due to the cooling of metal 15 cannot pass beyond the walls of bush 13 and no gripping is, therefore, felt by the shaft 10. Hence a finished hole is produced in frame 11 without necessitating undue effort in the removal of the shafts, with a minimum amount of the comparatively high priced bearing metal being used in the operation.

In the form shown in Fig. 3, all conditions above mentioned are present except that the bush 13 does not have any ribs 14. In that case a metal can be used for the lining that contracts slightly on cooling so as to firmly unite it with the bush 13 or the exterior of the bush 15 can be formed on an ordinary sand mold which will make it irregular enough to hold in the lining in many cases. Thus, the bush 13 will constitute a bearing bushing and it will not turn with the shaft if the shaft is properly lubricated.

In Figs. 4 and 5 the same principles above mentioned are applied in a case in which the opening for the shaft does not extend all the way through the frame 11. In that case the body of metal or alloy 15 is provided with a flat end 17 against which the end of the shaft may bear if desired. I have shown this arranged both with and without fins 14.

In Figs. 6 and 7 the principles above mentioned are applied to two semi-cylindrical bearings 20. These are formed like the bushes 13 and are made of proper alloy for serving as bearing surfaces for a rotating shaft.

Bearings 20 are held in a suitable jig or fixture which is in turn supported by the bracket 22 so as to locate the position of bush 20 in the desired relationship to the other surfaces of brackets 22. The soft metal 21 is thereupon poured between bush 20 and bracket 22 in a similar manner to that described above, forming thereby, an effective anchor or means for locking the bush 20 in the desired position. Suitable anchorages provided on the outer surface of bush 20 marked 23 on Fig. 6 and similar anchorages provided on the inner surface of bracket 22 form pockets into which the metal 21 is permitted to flow and congeal serving as a means to hold the two parts together.

Although I have illustrated and described only a few forms of the invention, I am aware of the fact that other modifications can be made therein by any person skilled in the art without departing from the scope of the invention as expressed in the claims. Therefore, I do not wish to be limited to any of the forms herein shown and described but what I do claim is:—

1. As an article of manufacture, a frame or support provided with an opening therein having a body of soft metal of a composition suitable for bearings cast around a mandrel of the size of the shaft to be received, whereby it has an inner smooth bearing surface exactly fitting the shaft and located in said opening, and a body of comparatively coarse soft metal cast in the opening in the support or frame and around said bearing metal, the first named soft metal body having fins in its outer wall projecting into the second body of metal to hold the bearing metal permanently in place.

2. As an article of manufacture, a frame or support having a passage with depressions and projections cast therein in a rough state, a body of relatively soft bearing metal of a composition incapable of material shrinkage in casting cast with its interior finished in the act of casting to the shape of the shaft to be carried by the bearing and located in said passage, and a body of metal cast in said passage and around said bearing metal and held fixedly by said projections and depressions in said passage and provided on its inner surface with projections and depressions therein for fitting said bearing metal body and fixedly holding the latter in position in said passage.

3. As an article of manufacture, a half bearing comprising a supporting part or frame having a recess therein, and a body of bearing metal permanently mounted inside the same of semi-circular shape with integral diametrically opposite flanges finished on the concave and flat surfaces in the act of casting, and a body of soft metal permanently located in said recess around the bearing metal to support and hold the latter.

In testimony whereof I have hereunto affixed my signature.

JOSEPH P. CATLIN.